United States Patent [19]

Mackley et al.

[11] Patent Number: 4,851,173
[45] Date of Patent: Jul. 25, 1989

[54] ORIENTED POLYMER FILMS, A PROCESS FOR THE PREPARATION THEREOF

[75] Inventors: Malcolm R. Mackley, Cambridge; Gary S. Sapsford, Bishops Stortford, both of England

[73] Assignee: National Research Development Corporation, London, England

[21] Appl. No.: 878,971

[22] PCT Filed: Sep. 13, 1985

[86] PCT No.: PCT/GB85/00424
§ 371 Date: May 20, 1986
§ 102(e) Date: May 20, 1986

[87] PCT Pub. No.: WO86/01810
PCT Pub. Date: Mar. 27, 1986

[30] Foreign Application Priority Data

Sep. 24, 1984 [GB] United Kingdom ............... 8424062

[51] Int. Cl.⁴ ............................................. B29C 41/24
[52] U.S. Cl. ................................. 264/204; 264/209.2; 264/216; 264/310; 264/331.17; 425/382.3; 528/502
[58] Field of Search ...................... 264/166, 204, 209.2, 264/211.1, 216, 310, 331.17, 334; 425/376 B, 382.3; 156/621, 622; 526/348, 352; 528/502

[56] References Cited

U.S. PATENT DOCUMENTS

| Re. 31,925 | 6/1985 | Jenks et al. ...................... 264/280 |
| 2,067,025 | 1/1937 | Schmidt .............................. 264/280 |
| 3,009,847 | 11/1961 | Alles et al. ........................ 264/216 X |
| 3,093,532 | 6/1963 | Miller et al. ................... 264/209.2 X |
| 3,767,737 | 10/1973 | Lundstrom ...................... 264/216 X |
| 3,961,122 | 6/1976 | Gaines, Jr. et al. ........... 264/216 X |
| 3,997,386 | 12/1976 | Oshida et al. ................... 264/248 X |
| 4,089,918 | 5/1978 | Kato et al. ...................... 264/166 X |
| 4,137,394 | 1/1979 | Meihuizen et al. ................. 528/502 |
| 4,268,470 | 5/1981 | Capaccio et al. .................. 528/502 |
| 4,403,069 | 9/1983 | Keller et al. ....................... 525/197 |
| 4,501,856 | 2/1985 | Harpell et al. ..................... 525/240 |
| 4,514,351 | 4/1985 | Kaeufer et al. ................. 264/280 X |
| 4,575,470 | 3/1986 | Fakirov et al. ............... 156/308.2 X |
| 4,643,865 | 2/1987 | Okada et al. ..................... 264/280 X |

FOREIGN PATENT DOCUMENTS

| 236107 | 10/1964 | Austria ............................. 156/308.2 |
| 686454 | 5/1964 | Canada ................................ 264/280 |
| 56875 | 8/1982 | European Pat. Off. . |
| 97008 | 12/1983 | European Pat. Off. ............ 264/280 |
| 2352020 | 12/1977 | France . |
| 46-38339 | 11/1971 | Japan ................................. 528/502 |
| 47-12851 | 4/1972 | Japan ................................. 264/216 |
| 53-117069 | 10/1978 | Japan ................................. 264/280 |
| 56-33924 | 4/1981 | Japan ................................. 264/280 |
| 59-220329 | 12/1984 | Japan ................................. 264/280 |
| 60-15120 | 1/1985 | Japan ................................. 264/280 |
| 773718 | 5/1957 | United Kingdom ............... 264/280 |
| 1360115 | 7/1974 | United Kingdom . |
| 1391525 | 4/1975 | United Kingdom ............... 264/216 |
| 2051667 | 1/1981 | United Kingdom ........... 264/331.17 |

OTHER PUBLICATIONS

Mackley and Sapsford, Techniques of Preparing High Strength, High Stiffness Polyethylene Fibers by Solution Processing.

Primary Examiner—Jeffery Thurlow
Assistant Examiner—Leo B. Tentoni
Attorney, Agent, or Firm—Finnegan, Henderson, Farabow, Garrett & Dunner

[57] ABSTRACT

A process for the continuous preparation of an oriented film of a polymer material comprising shearing at least one film of a solution and/or gel of the polymer material between at least one set of two solid surfaces which are in motion relative to one another. At least one of which surfaces is endless, so as to cause by the shearing, solidification of the polymer material from the solution or gel to a degree sufficient that a coherent, oriented film of the polymer material is formed on one of the surfaces. The film is sufficiently coherent so as to be capable of being removed from the surface on which it is formed in a continuous manner.

16 Claims, 4 Drawing Sheets

ORIENTED POLYMER FILMS, A PROCESS FOR THE PREPARATION THEREOF

This invention relates to oriented polymer films; more particularly, this invention relates to processes for the continuous preparation of oriented films of polymer materials; to apparatus which may be used in such processes; to oriented films of polymer materials so prepared and to certain oriented films as new products; and to composite materials comprising the oriented films.

It is known that a dilute solution of linear polyethylene of very high molecular weight (for example, $\overline{M}_w$ about $1.5 \times 10^6$) in xylene at a temperature up to about 125° C. will form a fibre when seeded from a surface in contact with the solution when this solution is subjected to Couette flow. (A. Zwijnenburg and A. J. Pennings, Colloid & Polymer Sci: 254, p. 868 (1976).) The fibre can be continuously removed as a thread line and reeled. Such fibres are found to have very high ultimate tensile strengths and Young's moduli (typically 1 GPa and 100 GPa, respectively).

More recently, it has been shown that by allowing such a fibre to seed from a rotating conical surface it may grow in a helical coil around the surface and will self-coalesce to form a ring of linear polyethylene film from the polyethylene solution. (A. Coombes and A. Keller, J. Polym. Sci. Polym. Phys. Ed., 17 p. 1637 (1979).) Furthermore, it has also been shown that the incorporation of polypropylene into the solution can similarly lead to films of a polymer material which is a varying blend of linear polyethylene and polypropylene. (A. Coombes, C. G. Cannon and A. Keller, J. Polym. Sci. Polym. Phys. Ed., 17 p. 1957 (1979).)

This invention seeks to provide a process for the continuous preparation for oriented films of polymer materials which is more suited to commercial production.

According, therefore, to one aspect of this invention, there is provided a process for the continuous preparation of an oriented film of a polymer material, which process comprises:

(i) shearing at least one film of a solution and/or gel of the polymer material between at least one set of two surfaces, at least one of which surfaces is endless and in relative motion; and (ii) continuously removing the or each oriented film of polymer material from one of the surfaces on which it is formed.

By "film of solution and/or gel" is meant herein a thin layer, typically of a thickness not greater than 3 mm.

The process of the present invention is applicable to any thermoplastic organic polymer material, preferably a crystallisable such polymer material, provided only that the polymer material comprises at least a fraction of sufficiently high molecular weight and that this latter material can form a solution and/or gel. Examples include linear vinyl hydrocarbon polymers, polyethylene oxide, polyacetals such as polyoxymethylene and polyacetaldehyde, aliphatic polyamides, polyesters such as polyethylene terephthalate and fluorinated polymers such as polyvinylidene difluoride.

Preferably, the polymer material comprises a polyolefin, for example polyethylene, polypropylene, a polyethylene-polypropylene copolymer or a polyolefin blend comprising at least one thereof, especially linear polyethylene.

It is desirable that the polymer material has a weight average molecular weight ($\overline{M}_w$) greater than about 500,000, desirably greater than about 600,000. Below this value there is not sufficient of the polymer material of sufficiently high molecular entanglement and/or relaxation time to enable highly oriented films, in which the polymer material is believed to exist as extended chain fibrils, to be formed by the process of the present invention with commercial viability, if at all. Preferably, $\overline{M}_w$ is greater than about 750,000, desirably greater than about 850,000, especially greater than about 1,000,000.

The film of solution and/or gel of the polymer material is preferably less than 3 mm thick, especially less than 2 mm thick. It is particularly preferred that the film is 1 mm thick or less; for example, no greater than 0.5 mm.

It is highly desirable, and usually necessary, to maintain the solution and/or gel of polymer material at an elevated temperature; for example, it is desirable to maintain the solution and/or gel at a temperature not less than 50° C., and preferably not less than 30° C., below the melting temperature of the polymer material. In the case of linear polyethylene, it is desirable that the solution and/or gel is maintained, at standard pressure, at a temperature greater than 90° C., desirably greater than 100° C., preferably at a temperature greater than 110° C., desirably greater than 120° C., such as up to 130° C. The solution and/or gel temperature should not exceed the melting temperature of the polymer material. The tensile properties of the oriented film are found to increase as the solution and/or gel temperature increases. However, the mass of oriented film produced per unit time is found to decrease with increasing solution and/or gel temperature but to increase with increasing shear. To obtain maximum mass per unit time of the oriented film it is, therefore, necessary to use as low a solution and/or gel temperature as is consistent with the required mechanical properties in conjunction with high shear. The mass growth rates exhibited are much greater than those found in equivalent fibre preparations. It is believed that the presence of a second surface enhances the mass growth rate (at a given temperature) by defining and increasing the effective width over which growth can occur and possibly also by providing enhanced shear between the surfaces.

The solvent used will depend on the nature of the polymer material. In the case of polyolefins, such as linear polyethylene, a hydrocarbon, for example an aromatic hydrocarbon boiling, at standard pressure, above 140° C. such as a xylene, may be used. For polyethylene oxide polar solvents, for example, water or chlorinated hydrocarbons, may be used. Solutions and/or gels of the polymer material having a concentration for example from 0.1 wt% to 10 wt%, preferably from 0.2 wt% to 5 wt% are desirable.

Desirably, the surface on which the oriented film of polymer material is formed is at least in part wetted and adhered to by the solution and/or gel of the polymer material. However, the oriented film so formed should, in general, be sufficiently mobile to facilitate ready stripping therefrom during its removal. The surface may be of the same or different polymer material, for example PTFE, or of a metal. The texture of the surface is also an important factor in determining whether the abovementioned functional requirements are met. Thus, where a surface of fabric, such as "leno" woven cotton, is used it is usually found that the oriented film is irremovably impregnated therein. (Such a material may, nonetheless, be of value as a composite material.) At the other extreme, where the surface is substantially completely not adhered to and smooth, such as a PTFE sheet, no film is usually formed. These effects can be utilised to good effect in accordance with a preferred compromise feature of this invention wherein a portion of, preferably the majority of the, or one of the, surfaces on which the oriented film of the polymer material is formed is smooth and not adhered to while a portion, preferably the minority, is adhered to by the solution and/or gel. Specifically, a smooth sheet, for example of PTFE, which is not adhered to can comprise a plurality of lines, for example two lines of stitches, for example of cotton thread, which extend in the machine direction. It is preferred that at least the or each surface on which the oriented film of the polymer material is formed is in motion.

It is also found, in accordance with a particularly preferred feature of this invention, that a relatively coarsely woven fabric such as a woven fabric may be used as a surface from which to form a harvestable oriented film of polymer material. The material known as "VELCRO" (manufactured in accordance with U.S. Pat. Nos. 2,717,434 and 3,009,235 and GB Pat. Nos. 1289825, 1295069, 1299897, 1345607 and 2009257; "VELCRO" is a registered Trade Mark) has been formed to be particularly suitable in this respect. Surprisingly, the continuous oriented films so produced show little or no tendency to lateral shrinkage on drying.

This invention also provides a process according to any preceding claim wherein a plurality of lines of oriented films of a polymer material is continuously prepared.

The or each oriented film of polymer material may be continuously removed in a manner known per se; for example using the haul-off shown in FIG. 5 of the accompanying drawings. It is found in practice that haul-off load is a good indicator of film thickness (that is, that growth occurs at constant stress).

According to a further aspect of this invention, there is provided apparatus for the continuous preparation of an oriented film of a polymer material, which apparatus comprises at least one set of two adjacent surfaces, at least one of which surfaces is endless, movable relative to each other; and means for continuously removing the or each oriented film of polymer material from one of the surfaces on which it is formed. Preferably, such apparatus additionally comprises one or more baths in which the or each set of adjacent surfaces is contained.

Desirably, the, or one of the, endless surfaces in the, or one of the, sets comprises a belt of a cylinder. Increase in diameter of the cylinder, as in scale-up, will increase the defined contact area and possibly also the shear and thus, as mentioned earlier, the mass of oriented film produced per unit time. The other surface may comprise a chisel-edged seed-rod of the polymer material or blade or metal. However, it is preferred that the two surfaces in the, or one of the, sets are endless.

The machine direction of the oriented film of the polymer material, the direction of one surface, for example the belt and the shear axis of the other surface for example, the cylinder in a set are independently variable. When none of these is normal to any other the oriented film is oriented in a direction different from the machine direction and the degree of orientation changes continuously across the film. Where in the, or one of the, sets the machine direction of the oriented film of polymer material is normal to one surface but not normal to the shear axis of the other surface, the oriented film is oriented in the machine direction but the degree of orientation changes continuously across the film. Where in the, or one of the, sets the machine direction of the oriented film of polymer material is normal both to one surface and to the shear axis of the other surface, the oriented film is oriented in the machine direction and the degree of orientation does not substantially change across the film. Preferred apparatus as herein described is that wherein in the, or one of the, sets one surface comprises a belt and the other surface comprises a right cylinder rotatable about its axis and bounded, at least in part, by the belt.

With such apparatus there are, in principle, five modes of operation:
(a) a moving cylinder and stationary belt;
(b) a moving cylinder and a belt moving in the opposite hand;
(c) a moving cylinder and a belt moving in the same hand but slower;
(d) a moving cylinder and a belt moving in the same hand but faster;
(e) a stationary cylinder and a moving belt.

In practice, (a) does not appear to produce continuous lengths or oriented film; indeed, it has been found that, using a VELCRO surface, a belt tension of at least 20N, and preferably greater than 25N is required to produce an oriented film.

This invention also provides an oriented film of a polymer material, especially linear polyethylene or polypropylene or a blend thereof, prepared by a process, or in apparatus, as herein described. More particularly, this invention provides a continuous length of an oriented film of linear polyethylene, especially with $\overline{M}_w$ greater than 500,000, which has a Young's modulus greater than 40 GPa, preferably greater than 50 GPa. The Young's modulus is suitably measured along the machine direction; the direction in which the oriented film is formed.

This invention further provides a continuous length of an oriented film of polypropylene, especially with $\overline{M}_w$ greater than 500,000 which has a Young's modulus greater than 20 GPa. It may be advantageous for the oriented film to be fibrillated.

In accordance with a further aspect of this invention, there is provided a composite material the dispersed phase of which comprises an oriented film of a polymer material as herein described. The continuous phase may comprise a cement such as a Portland or pozzolanic cement, a thermosetting polymer matrix such as an epoxy resin, or a thermoplastic matrix such as a polyolefin, for example polyethylene, polypropylene or a blend thereof. It may be advantageous for the oriented film to be comminuted prior to incorporation in the continuous phase.

The invention will be further described, by way of example, with reference to the accompanying drawings in which.

Figure 1:
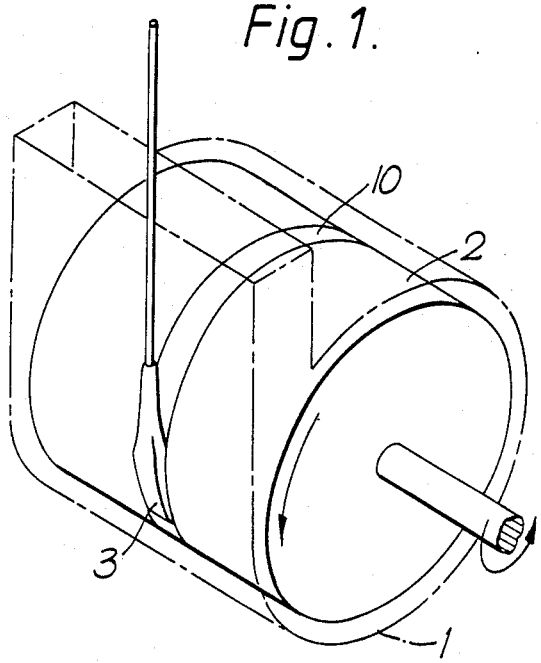
FIG. 1 represents apparatus according to the invention in which one surface is provided by a chisel-shaped seed-rod and the other by a rotatable cylinder.
Figure 4:
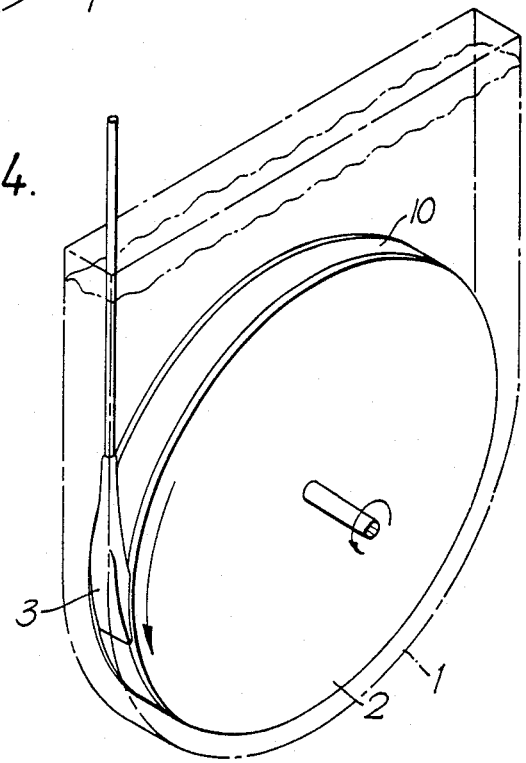
FIG. 4 represents apparatus according to the invention in which one surface is provided by a chisel-shaped seed-rod and the other by a rotatable cylinder of large (27 cm diameter compared with 8 cm diameter) diameter.

In the drawings, the apparatus represented in FIGS. 1 and 4 comprises a bath 1 in which a cylinder 2 having a cylindrical surface of PTFE rotatable about a horizontal axis is contained. A chisel-shaped seed-rod 3 of polyethylene is maintained in sliding contact with the cylinder.

Figure 2:
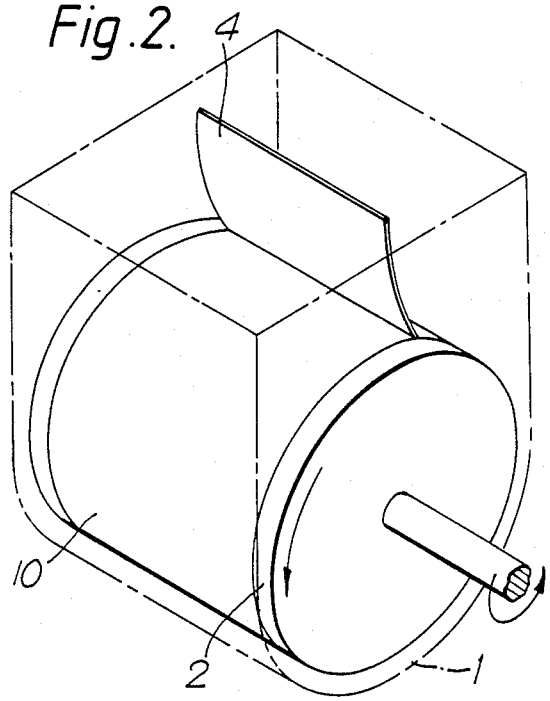
FIG. 2 represents apparatus according to the invention in which one surface is provided by a scraper blade and the other by a rotatable cylinder.

In FIG. 2 the seed-rod is replaced by a scraper blade 4 of sprung steel.

Figure 3:
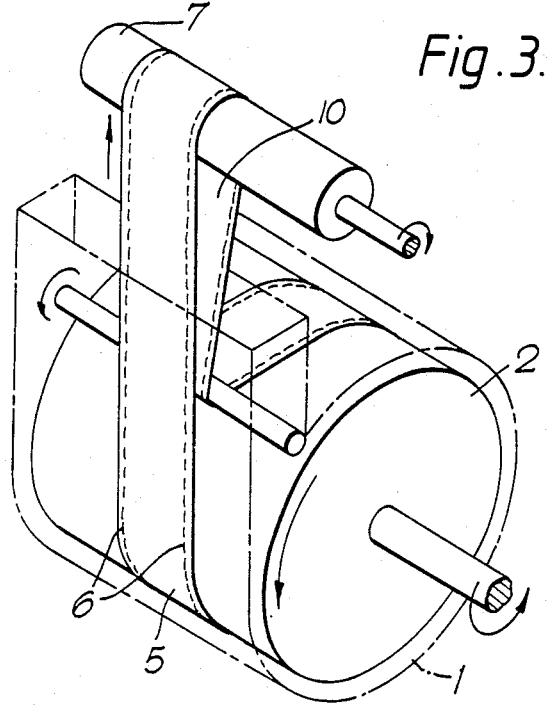
FIG. 3 represents apparatus according to the invention in which one surface is provided by a belt and the other by a rotatable cylinder.
Figure 5:
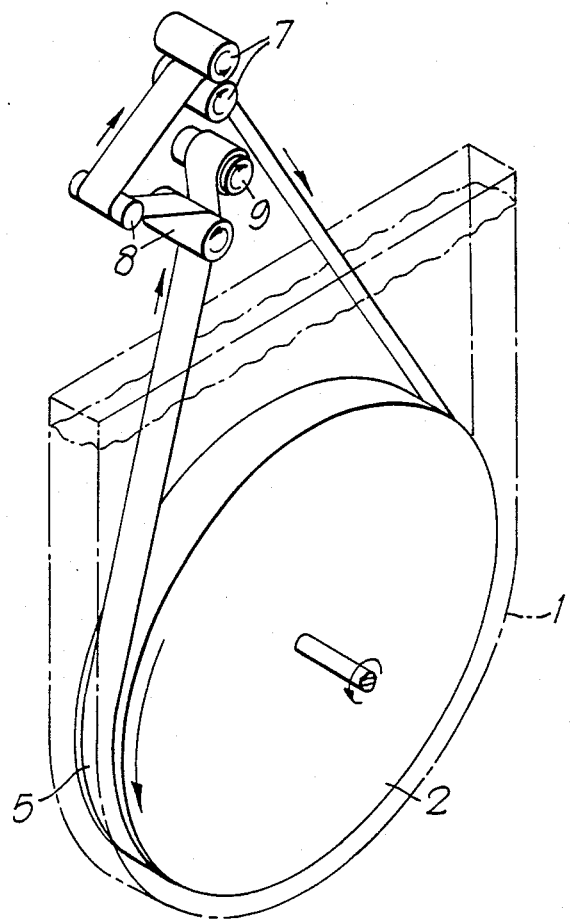
FIG. 5 represents apparatus according to the invention in which one surface is provided by a belt and the other by a rotatable cylinder of large diameter.
Figure 6:
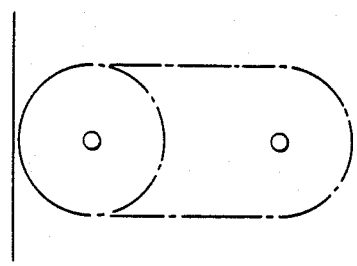
FIGS. 6 to 10 inclusive schematically represent other surface configurations.
Figure 7:
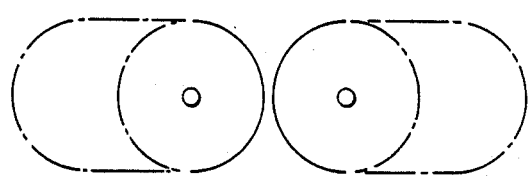
Figure 8:
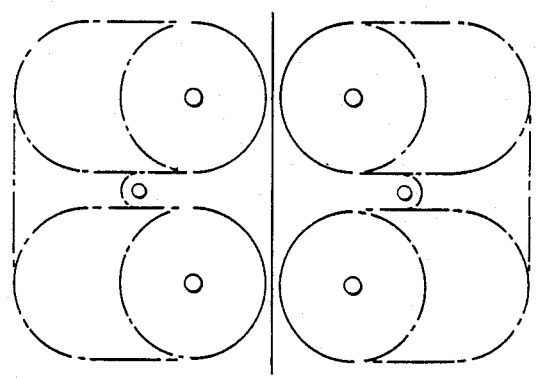
Figure 9:
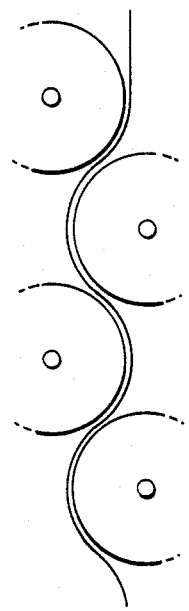
Figure 10:
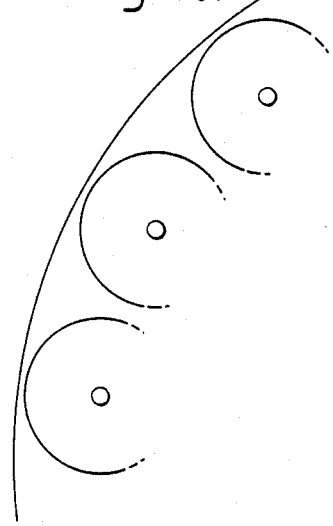

In FIGS. 3 and 5 the seed-rod is replaced by a continuous belt 5 of PTFE which comprises two lines 6 of stitched cotton thread which is in sliding contact with the cylinder and which is friction drivable by passage over drivable roller(s) 7. In FIG. 3 there is also represented belt-tensioning spools 8 over which the belt is laced and a film wind-off spool 9.

In use, the bath 1 is substantially filled with a dilute (less than 10 wt%) solution and/or gel of high molecular polyethylene in xylene which is equilibriated at about 110° C. by heating means (not shown). The cylinder is then caused to rotate by drive means (not shown). Thereafter the seed-rod, scraper blade or belt is maintained in sliding contact (the belt optionally being driven) with the cylinder. As film 10 is formed it is laced to a wind-off spool.

The following Examples illustrate the invention.

EXAMPLE 1

5 g of high molecular weight linear polyethylene ("Hostalen GUR 415 ex Hoechst") was added, together with 5 g of antioxidant ("Topanol" C.A. ex I.C.I.), at room temperature to 1,000 cm$^3$ of xylene (technical grade) in a "Thermomix" heater/blender. The heater/blender had been adapted by inclusion of a nitrogen purge and a "Eurotherm" temperature controller; it was also solvent proofed. The heater/blender was then switched on and allowed to heat up to 128° C. while being agitated for about 10 minutes. Mixing was continued for a further 30 minutes at this temperature before the resulting solution and/or gel was transferred to the apparatus for processing. All of the solution and/or gel preparation was carried out under a nitrogen blanket.

The processing apparatus was essentially as shown in FIG. 1 of the accompanying drawings. The rotatable cylinder had a diameter of 8 cm and the solution and/or gel was maintained therein at a temperature of 110° C. The rotatable cylinder was then set in motion with a surface linear velocity of 8.5 m.min$^{-1}$. After 5 minutes a chisel-shaped seed-rod of polyethylene was inserted into the bath and maintained in sliding contact with the cylinder. Film began to grow on the cylinder surface with a width essentially the same as that of the seed-rod. The film appeared to form by the simultaneous, parallel growth across the whole width of the seed-rod (and not as a single fibril coiling repeatedly about the cylinder).

The experiment was repeated using conditions shown in the Table.

TABLE

|  |  | Seed-rod | Scraper-blade | Belt (a)' | Belt (b) | Belt (c) |
|---|---|---|---|---|---|---|
| Cylinder speed (m. min$^{-1}$) | 8 cm diameter | 8.5 | 13.5 | 8.5 | 8.5 | 8.5 |
| Belt speed (m. min$^{-1}$) | 8 cm diameter | — | — | 0 | −0.9 | +0.9 |
| Cylinder speed (m. min$^{-1}$) | 27 cm diameter | 27.2 | — | 18 | — | 18 |
| Belt speed (m. min$^{-1}$) | 27 cm diameter | — | — | 0 | — | +0.9 |

In the case of belt-induced growth a belt of PTFE of about 46 cm circumference and 2.6 cm width and sewn with cotton as aforesaid was used with the 8 cm diameter cylinder while with the 27 cm diameter cylinder the belt was about 100 cm circumference and 1.8 cm width.

Temperature could range from 90° to 130° C.; cylinder speed from 0 to 100 m.min$^{-1}$ and belt speed (where applicable) from 0 to ±100 m.min$^{-1}$.

The films produced had a nominal tensile strength of 1.24 GPa and an initial Young's modulus of 41 GPa. (It is believed that, as the film is produced in a more homogeneous manner, these values will increase.)

EXAMPLE 2

Proceeding in essentially the manner of the preceding Example but utilising the apparatus shown in FIG. 5 of the accompanying drawings with a "VELCRO"-coated belt at a temperature of 110° C. and a cylinder speed of 10.8 m.min$^{-1}$ and a belt speed of 0.3 m.min$^{-1}$ of opposite hand (mode b) a 2.1 m length of tape was harvested from a belt 1.7 m in length.

We claim:

1. A process for the continuous preparation of an oriented film of a polymer material, which process comprises:
   (i) shearing at least one film of a solution and/or gel of the polymer material between at least one set of two solid surfaces which are in motion relative to one another and which in a zone in which said shearing takes place, co-extend in closely adjacent face-to-face relationship, at least one of which surfaces is endless, so as to cause by said shearing, solidification of said polymer material from said solution or gel to a degree sufficient that a coherent, oriented film of said polymer material is formed on one of said surfaces, which film is sufficiently coherent to be capable of being removed from the surface on which it is formed; and
   (ii) continuously removing the or each oriented film of polymer material from the surface on which it is formed.

2. The process of claim 1 wherein said polymer material is a polyolefin.

3. The process of claim 2 wherein said polyolefin is selected from the group consisting essentially of polyethylene, polypropylene, a polyethylene-polypropylene copolymer or a polyolefin blend comprising at least one thereof.

4. The process of claim 3 wherein said polyethylene is linear polyethylene.

5. The process of claim 4 wherein said polymer material has a weight average molecular weight greater than 500,000.

6. The process of claim 5 wherein said polymer material has a weight average molecular weight greater than 750,000.

7. The process of claim 6 wherein said polyethylene is a linear polyethylene having a weight average molecular weight greater than 1,000,000.

8. The process of claim 7 wherein the or each oriented film of solution and/or gel of the polymer material has a thickness no greater than 2 mm.

9. The process of claim 8 wherein the solution of the polymer material is maintained, at standard pressure, at a temperature greater than 90° C.

10. The process according to claim 9 wherein the solution is maintained at standard pressure, at a temperature greater than 110° C.

11. The process of any preceding claim wherein said solution further comprises a hydrocarbon having a boiling point above 140° C. at standard pressure.

12. A process according to any preceding claim wherein the concentration of the polymer material in the solution is from 0.1 wt% to 10 wt%.

13. A process according to any preceding claim wherein the, or one of the, surfaces on which the oriented film of polymer material is formed is at least in part adhered to by the solution and/or gel of the polymer material.

14. A process according to claim 13 wherein a portion of the, or one of the, surfaces on which the oriented film of the polymer material is formed is smooth and not adhered to while a portion is adhered to by the solution and/or gel.

15. A process according to any preceding claim wherein at least the or each surface on which the oriented film of the polymer material is formed is in motion.

16. A process according to any preceding claim wherein a plurality of lines or oriented films of a polymer material is continuously prepared.

* * * * *